(12) United States Patent
Bhagavath et al.

(10) Patent No.: US 6,363,150 B1
(45) Date of Patent: Mar. 26, 2002

(54) BILLING METHOD FOR CUSTOMERS HAVING IP TELEPHONY SERVICE WITH MULTIPLE LEVELS OF SECURITY

(75) Inventors: Vijay K Bhagavath, Lincroft; Hopeton S Walker, Haledon, both of NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/475,286

(22) Filed: Dec. 30, 1999

(51) Int. Cl.[7] .............................. H04K 1/00; H04M 1/24
(52) U.S. Cl. .................. 380/225; 380/257; 370/463; 713/189; 713/200; 713/166; 379/35
(58) Field of Search ................. 379/114.01, 114.05, 379/114.06, 121.01, 7, 35; 370/462, 463; 713/189, 200, 201, 166; 380/255, 257

(56) References Cited

U.S. PATENT DOCUMENTS

| | | | | |
|---|---|---|---|---|
| 5,867,494 A | * | 2/1999 | Krishnaswamy et al. | ... 370/352 |
| 5,903,721 A | * | 5/1999 | Sixtus | ........................ 713/201 |
| 6,292,481 B1 | * | 9/2001 | Voit et al. | ................... 370/352 |

* cited by examiner

Primary Examiner—Binh Tieu
(74) Attorney, Agent, or Firm—Banner & Witcoff, Ltd.

(57) ABSTRACT

A method for initiating a security and billing feature request at the beginning or during an active telephone call. The telephone subscriber can select one of a plurality of security levels that may be required to ensure privacy during a call. Since each level of security is based on a different encryption and authentication algorithm, the levels of security can be incrementally priced. Thus, selecting an algorithm which is deemed to be very secure can be billed to the subscriber at a higher rate than an algorithm that is deemed to be less secure.

17 Claims, 2 Drawing Sheets

BILLING METHOD FOR CUSTOMERS HAVING IP TELEPHONY SERVICE WITH MULTIPLE LEVELS OF SECURITY

BACKGROUND OF THE INVENTION

The present invention generally relates to the field of subscriber telecommunications and related systems. More particularly, the invention is directed to a method for initiating a security feature request at the beginning or during an active telephone call and billing the subscriber in accordance with the level of selected security.

There are many instances when a telephone subscriber wishes to place a call with the assurance that the call will be secure and free from monitoring by unauthorized persons. This need for privacy is becoming more and more important as online services continue to proliferate. For example, many banks now offer their customers online banking services which can be conducted over the telephone using the telephone touch tone keypad.

While such services usually require a Personal Identification Number (PIN) as well as other identifying information, a skilled pirate can easily obtain this information by tapping into the telephone subscriber's phone line. Using readily available equipment, the DTMF tones which customarily are used to enter identifying information at the beginning of an online banking session can be easily decoded. Similar piracy opportunities exist when credit card information is given over an unsecured telephone line.

The prior art is devoid any effective way to prevent unauthorized reception of private information during a subscriber telephone call. This problem is of particular significance in IP telephony in comparison to telephone calls placed over the so-called twisted pair. Security usually is not a major issue when using conventional telephone lines because the communication does not go over public or private networks which are outside of the control of the telephone company. All of the switching and transmission infrastructure of a conventional twisted pair telephone system usually is owned by the telephone company and can be maintained in a secure manner.

On the other hand, IP telephony is necessarily conducted over public and private IP networks which are not under the control of a single authority. The very nature of the Internet prevents end-to-end control of the infrastructure by the same authority. Thus, security in IP networks is a major concern.

Currently, the Internet Protocol lacks the necessary features that allow users to select the required level of security that may be required to ensure privacy. Accordingly, there exists a need in the art to provide a method for secure IP telephony services. Ideally, the security features should be available to the subscriber on an as needed basis. Whether the subscriber chooses to implement a security feature will depend on the sensitivity of the information to be protected.

It is, of course, possible to implement a high level of security on the network on a permanent basis. In other words, the telephone network would always be in its most secure state. There are trade offs, however, with taking this approach. Implementing a level of network security sufficient to accomplish the task results in additional loading of the network. Such loading may likely result in unacceptable delays which adversely effect the quality of the telephone call. It may not be possible, even with the use of faster and more expensive network equipment to completely eliminate the delay. Of course the use of more expensive equipment increases the cost of the telephone call.

Another factor which militates against always operating the network in its most secure state is the fact many countries have regulations which limit the export of encryption technology. Thus, IP telephone calls conducted across country borders must take into account such regulations. In many cases, these regulations would prevent strong encryptions algorithms from being employed during inter-country IP telephone calls.

In addition to the concerns discussed above with respect to selecting an appropriate level of security, the corresponding issue of cost must be addressed as well. In most cases, the level of security made available in any system has a direct relationship to its cost. It is generally true that the better the security the higher the cost.

Ideally, the level of security should only adequate for the need in the interest of minimizing the cost. Dynamic selection of security in accordance with need and billing the user in accordance with the selection has not been achieved in the prior art. Accordingly, there remains a need for such a feature in sensitive communications systems.

SUMMARY OF THE PRESENT INVENTION

Accordingly, it is an objective of the present invention to obviate the above-noted shortcomings and disadvantages of present unsecured telephone services.

It is a still further objective of the present invention to provide a method of implementing a security feature in telephone services and a corresponding billing system.

It is a still further objective of the present invention to provide a method for implementing a security feature and billing system in telephone services which can be readily implemented using existing communication networks.

The present invention provides a method for securing IP telephony calls over networks that have a shared media architecture and billing the subscriber accordingly. Such networks include, for example, hybrid fiber coaxial cable (HFC), Microwave Multi point Distribution Systems (MMDS) and Local Multi point Distribution Systems (LMDS).

The invention enables telephone subscribers to select one of a plurality of security levels that may be required to ensure privacy during a call. Since each level of security is based on a different encryption and authentication algorithm, the levels of security can be incrementally priced. Accordingly, selecting an algorithm which is deemed to be very secure can be billed to the subscriber at a higher rate than an algorithm that is deemed to be less secure. This cost differential to the subscriber can be justified because of the direct correlation between the algorithms sophistication, quality and cost.

Subscribers will also have the ability to vary the level of security in real-time. Thus, if a user is on a call and decides to change the security level of the call to ensure better security, the user can enter the appropriate DTMF sequence to change to the required security level and be billed accordingly.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

BRIEF DESCRIPTION OF THE PREFERRED EMBODIMENT

A preferred embodiment of the present invention will now be described with reference to the drawings.

Figure 1:
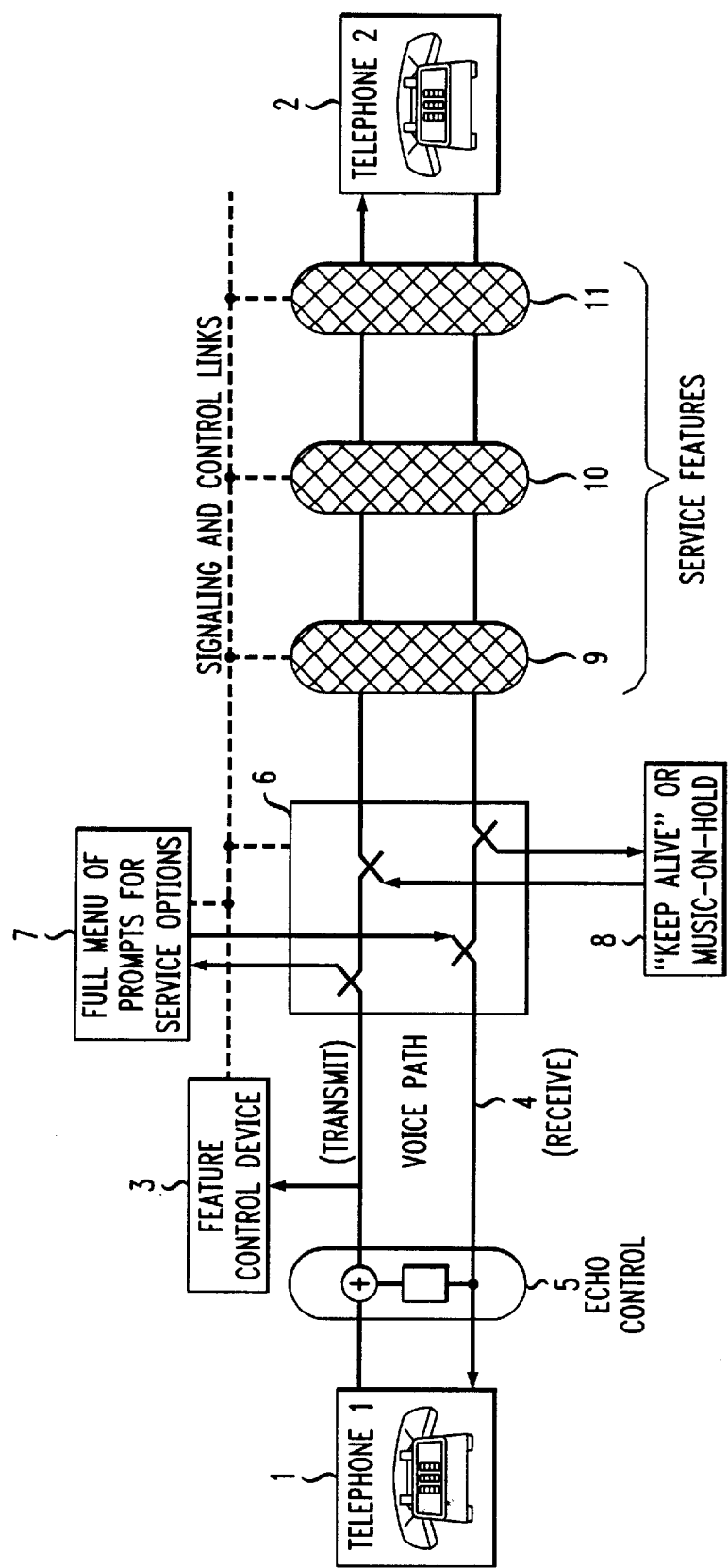
FIG. 1 is a block diagram illustrating the implementation of a method of initiating a security feature request in a telephone network in accordance with the present invention.

FIG. 1 illustrates the implementation of the present invention in a twisted-pair telephone system. The system includes user telephones 1 and 2 and security feature control device 3. Device 3 is located in the four-wire portion 4 of the telephone network where the two directions (transmit and receive) of the voice signal are carried separately. Device 3 includes speech and DTMF tone recognition circuitry as is known in the art. Thus, device 3 can reliably detect and respond to security feature requests during an active telephone call.

As shown in FIG. 1, security feature control device 3 is listening only to signals coming from telephone 1 toward telephone 2. Although not shown in FIG. 1, an identical security feature control device 3 may be used to listen for requests for security features coming from telephone 2.

If device 3 recognizes the correct combination of DTMF tones or spoken words from telephone 1, it will either invoke the appropriate security feature or it will connect telephone 1 to a network device 5 that can prompt for detailed information about the desired security feature. In the latter case, telephone 1 may be temporarily connected to a keep-alive signal such as music-on-hold 7 by switching device 8. Switching device 8 also makes available to the caller a menu 6 of prompts and security service options. The requested security features 9, 10, and/or 11, for example, may then be provided to the caller in accordance with the caller's request.

Another approach to initiating a change in security level is through spoken word commands. Speech recognition technology has advanced to the point that a spoken command such as "Go To Security Level Two" to initiate a change in security levels.

Figure 2:
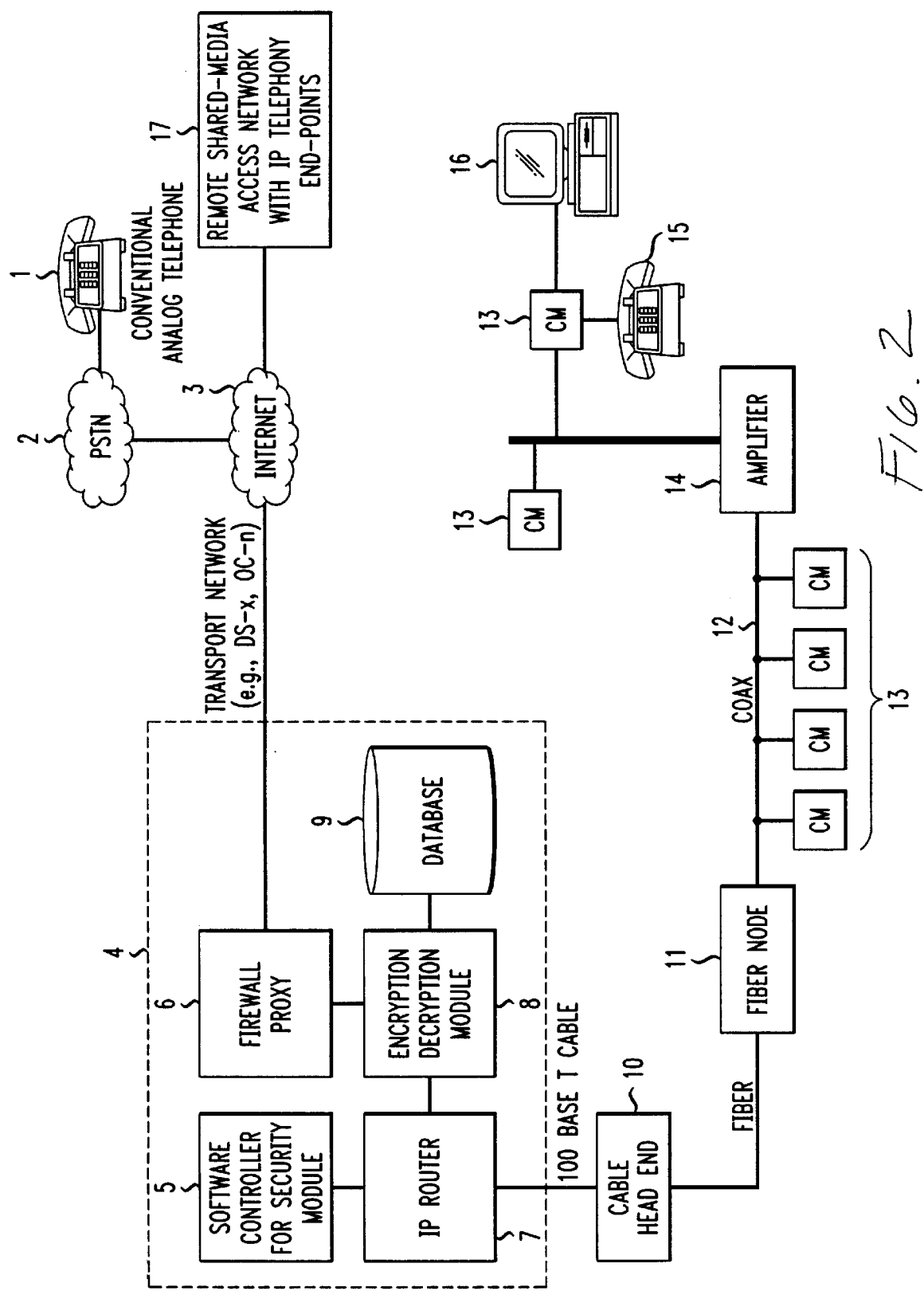
FIG. 2 is a block diagram illustrating the implementation of a method of initiating a security and billing feature request in an IP telephone network in a cable television plant environment.

FIG. 2 illustrated the present invention in an IP telephony environment. FIG. 2 shows a conventional analog telephone 1 connected to the Internet 3 via PSTN 2. Also connected to Internet 2 is a transport network 4 for a cable television system. A cable television system is but one environment in which an IP telephony system may be implemented.

Transport network 4 includes a firewall proxy 6 and an IP router 7 as known in the prior art. Also included is an encryption/decryption module 8, database 9 and a software controller 5 for encryption/decryption module 8 which is added to transport network 4 by way of the present invention.

Transport network 4 is connected to cable head end 10 which is well known in the prior art and serves as the central control and delivery point for media services to subscribers of the cable system. The cable system includes distribution fiber cable 12 which connects each subscriber's cable modem 13 to cable head end 10 via fiber node 11. One or more distribution amplifiers 14 may also be provided, depending on the size of the cable plant. Also shown in FIG. 2 is a Personal Computer (PC) 16 which is connected to the subscriber cable modems along with an IP telephone 15. FIG. 2 further illustrates remote shared media access with telephony end-points 17 connected to Internet 3.

One or the other subscribers at telephone sets 1 and 15 shown in FIG. 2 can enter appropriate DTMF tones at call initiation, or during a call, to enable and select the appropriate level of security required. The user dials a number along with the appropriate dialing sequence required to activate the feature. Software controller 5 for security module 8 then decodes the sequence and determines the level of security that is required by the user.

Software controller 5 then instructs encryption/decryption module 8 to setup the appropriate level of security. Additionally, when the feature is activated, software controller 5 can initiate a verbal confirmation message informing the user that the feature is activated and optionally announce or display the associate charges. In the event that the user does not want to incur the charge associated with the selected security level, the user would have the option of selecting a cheaper alternative security level.

In another embodiment of the present invention, there may exist in transport network 4 a predefined database 9 containing a list of selected numbers along with the appropriate level of security that is required when those number are called. As a result, when a call is placed, the database is consulted to determine if the called number is one that is listed which requires a predefined level of security treatment. If the number is listed in the database, then the predefined level of security is used. If the called number is not listed in the database, then either no security treatment is utilized or a default level specified by the subscriber is utilized.

In setting up database 9, the telephone service provider can enter the information from the provisioning terminal or the subscriber could have the capability of entering their own information. In one embodiment for entering the information, the user may enter information from a telephone such as an analog phone, a video telephone or an IP telephone. In yet another embodiment, the user may enter information via an Internet interface having access to the database.

In a future embodiment of the invention, the customer premises equipment (CPE) or other terminating device may have intelligence built into the device to detect the number that is being dialed. Once the number is detected, the device compares the dialed number to a list of numbers stored in its internal memory.

If a match is found, the appropriate level of security is determined from the device's memory and the appropriate DTMF tone used to enable and select the feature is automatically generated by the device.

As described above, the instant invention enables subscribers to select one of a plurality of security levels that may be required to ensure privacy during a call. Since each level of security is based on a different encryption and authentication algorithm, the levels of security will be incrementally priced. Consequently, selecting an algorithm which is deemed to be very secure will cost more than selecting an algorithm that is deemed to be less secure. This is because of the direct correlation between the algorithm sophistication, quality and cost.

Database 9 illustrated in FIG. 2 may also be used to maintain a billing schedule which correlates a billing fee for each level of security. When a level of security is selected, controller 5 consults this schedule with respect to the fee for the selected level. Controller 5 may also signal the user as to the fee and give the user an opportunity to accept or select a different level of security.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. A method of allowing a user of an IP telephone network having multiple levels of security to initiate a change in security level during an in-progress call, said method comprising the steps of:

receiving and recognizing a security signal entered by the telephone network user;

associating said security signal with a request for a change in said security level;

providing the requested change in said security level in accordance with said security signal; and assigning a cost value to said selection.

2. The method of claim 1, wherein said security signal is a touch tone signal from a DTMF touch pad.

3. The method of claim 1, wherein said security signal is an electronic signal from an electronic display having a user interface.

4. The method of claim 2, wherein the step of receiving said touch tone signal includes the step of measuring the duration of said touch tone signal and discarding said touch tone signal when said duration is less than a predetermined amount.

5. The method of claim 1, further including the step of providing an acknowledgment prompt to the user indicating that said request for a change in said security level is being processed.

6. The method of claim 1, further including the step of connecting any other users of said in-progress call to an audible signal that encourages those users to wait while said change in security level is initiated.

7. The method of claim 2, further including the steps of receiving and recognizing a voice signal resulting from the telephone network user speaking a predetermined word;

associating the combination of said voice signal and said touch tone signal with a request for a change in said security level; and providing the requested change in security level in accordance with said combination of touch tone signal and voice signal.

8. The method of claim 7, wherein the step of receiving said touch tone signal includes the step of measuring the duration of said touch tone signal and discarding said touch tone signal when said duration is less than a predetermined amount.

9. The method of claim 7, further including the step of measuring the duration of time between said step of receiving a touch tone signal and said step of receiving a voice signal and discarding said signals when said duration is greater than a predetermined amount.

10. The method of claim 7 further including the step of recognizing the context created by said touch tone signal and using said context to improve the accuracy of said recognition of said voice signal.

11. The method of claim 7, further including the step of recognizing the context created by said touch tone signal and using said context to simplify said recognition of said voice signal.

12. The method of claim 7, further including the step of recognizing the context created by said voice signal and using said context to distinguish said touch tone signals intended to invoke a change in said security level from touch tone signals not intended to invoke a change in said security level.

13. The method of claim 7, wherein the step of associating said touch tone signal and voice signal with a request for a change in said security level further includes the step of associating said combination of touch tone signal and voice signal with a call security feature group containing a plurality of security levels.

14. The method of claim 7, wherein said voice signal is a predetermined spoken word.

15. The method of claim 1 further including the step of maintaining a database correlating said cost value with each said selected change in security level.

16. The method of claim 15, further including the step of identifying to the user said cost value.

17. The method of claim 16, wherein said user may request a different securlity in response to said identifying step.

* * * * *